April 15, 1969    P. GODLEY II    3,438,393
VALVE
Filed July 20, 1966
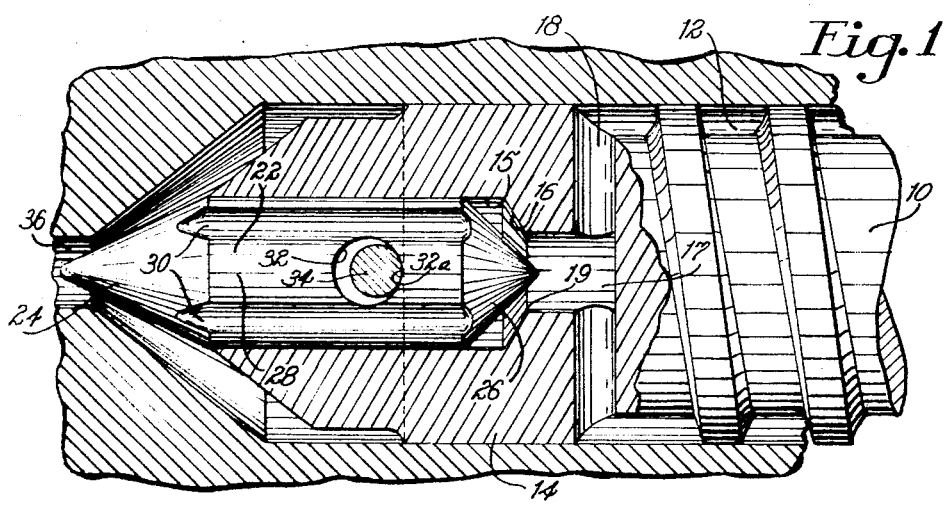
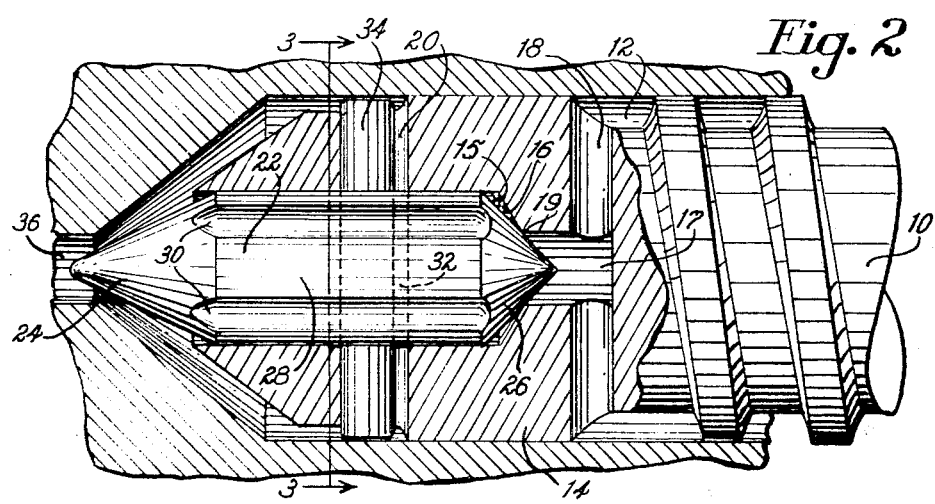
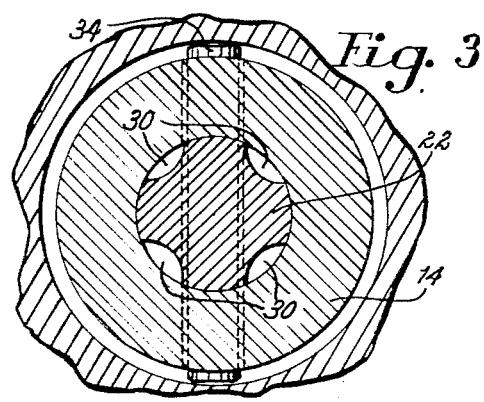

United States Patent Office 3,438,393
Patented Apr. 15, 1969

3,438,393
VALVE
Philip Godley II, Wilton Center, N.H., assignor to Improved Machinery Inc., Nashua, N.H., a corporation of Maine
Filed July 20, 1966, Ser. No. 566,557
Int. Cl. F16k *15/02, 51/50*
U.S. Cl. 137—533.17                     4 Claims This invention relates to non-return check valves especially useful at the nozzle of an injection molding apparatus.

Primary objects of the invention are to provide a non-return check valve in which the movable valve member (e.g., a ball, poppet or ring) is retained in the main valve body by an arrangement that is structurally strong, does not accumulate and trap thermoplastic material that might contaminate subsequent operations, is easily disassembled for replacement and cleaning, and is simple and inexpensive to manufacture.

In general, the invention provides a check valve in which a movable member having a first sealing portion is supported in a main valve body having a second sealing portion, the movable member being movable between a first position in which the sealing portions cooperate to prevent the flow of thermoplastic material past the movable member, and a second position in which the sealing portions are spaced to allow flow of thermoplastic material past the movable member. The movable member has a stop portion, and a retaining member is located in the path of the stop portion, spaced forwardly of the stop portion when the movable member is in its first position so as to prevent forward movement of the movable member beyond its second position. A retaining portion or passage in the main valve body loosely holds or retains the retaining member in the main valve body while being substantially larger than the retaining member to allow substantial flow of thermoplastic material between the walls of the passage and retaining member. In preferred embodiments the retaining passage is a bore; the retaining member is a pin located in the bore and spaced from its inside surface; and a movable grooved poppet is provided, the pin passing through the poppet, the front of the poppet acting as an injection head.

Other objects, features, and advantages will appear from the following description of a preferred embodiment of the invention, taken together with the attached drawings thereof, in which:

FIG. 1 is a vertical axial section of injection molding apparatus having the check valve of the invention;

FIG. 2 is a horizontal axial section of apparatus of FIG. 1; and

FIG. 3 is a section of the check valve movable member taken along 3—3 of FIG. 1.

The injection molding apparatus shown includes a conventional plasticizing and injecting screw 10 reciprocally operable inside chamber 12. The forward portion 14 of screw 10 acts as a main valve body and has at its front an axial cylindrical bore 15 having a conical rear portion 16 communicating through axial passage 17 (having front sealing rim 19) and diametric passage 18 with chamber 12.

Vertical bore 20 passes through portion 14, intersecting bore 15, and provides an internal cylindrical pin retaining surface.

Poppet 22 is axially movable in bore 15 and has front conical portion 24, rear conical sealing portion 26, and central cylindrical portion 28 along the surface of which are axial grooves 30. The ungrooved part of the surface of portion 28 slidingly contacts the inner surface of bore 15. Vertical bore 32, providing rear stop surface 32a, passes through poppet 22 and communicates with bore 20.

Cylindrical retaining pin 34 is located in bores 20 and 32 to retain poppet 22 in portion 14. A clearance (e.g., .005″–.25″) is provided between pin 34 and the inside surface of bore 20, to allow relatively free flow of thermoplastic material through bore 20 around pin 34.

In operation, plasticized material is fed by the screw through passages 17 and 18 and around poppet 22 through grooves 30 forcing the poppet to its forward position in which sealing portion 26 is spaced from sealing rim 19, stop surface 32a and pin 34 cooperating to limit the forward movement of the poppet. When sufficient thermoplastic material has accumulated forward of the screw, the screw is moved forward in an injection stroke, portion 24 acting to eject the shot through opening 36. During the injection stroke poppet 22 is forced into its rearward position with portion 26 and rim 19 cooperating to prevent back flow of material. By virtue of the spacing between pin 34 and bore 20 free circulation of thermoplastic material around the pin is permitted, preventing accumulation of possibly contaminating material. The ease with which pin 34 can be removed facilitates cleaning and replacement.

Bore 32 must, of course, be sufficiently large to allow movement of poppet 22 between its forward and rearward positions.

What is claimed is:

1. In injection molding apparatus for thermoplastic material, a check valve, comprising:
   a main valve body having a first sealing portion,
   a movable member having a stop portion and second sealing portion, said movable member being movable between a first position in which said sealing portions cooperate to prevent the flow of thermoplastic material past said movable member, and a second position in which said sealing portions are spaced to allow flow of thermoplastic material past said movable member,
   a returning member located in the path of said stop portion, and spaced from the position of said stop portion corresponding to said first position of said movable member in the direction of the position of said stop portion corresponding to said second position of said movable member, said retaining member thereby cooperating with said stop portion to prevent movement of said movable member away from said first position beyond said second position, and
   a retaining passage in said main valve body loosely receiving said retaining member and holding said retaining member in said main valve body, said passage being substantially larger than said retaining member and allowing substantial flow of thermoplastic material through said passage between the walls of said passage and said retaining member.

2. The valve of claim 1 wherein said retaining portion is a bore and said retaining member is a pin located in but spaced from the inside surface of said bore.

3

3. The valve of claim 1 wherein said movable member is a poppet having a forward injecting head and a plurality of axial grooves communicating with the space forward of said head, said poppet having a bore in which said retaining member is located, the inner surface of said bore providing said stop portion.

4. The valve of claim 3 wherein said retaining portion is a second bore communicating with said bore in said poppet and said retaining member is a pin passing through said bores.

References Cited

UNITED STATES PATENTS

| 1,061,069 | 5/1913 | Harber | 137—533.17 X |
| 1,220,944 | 3/1917 | Bridgham | 137—460 X |
| 1,640,408 | 8/1927 | House | 137—533.17 X |
| 2,310,902 | 2/1943 | Voelkel | 137—533.17 X |
| 2,755,816 | 7/1956 | Collins | 137—533.17 X |
| 2,899,974 | 8/1959 | Gratzmuller | 137—533.19 X |

FOREIGN PATENTS

| 575,050 | 3/1958 | Italy. |
| 931,902 | 7/1963 | Great Britain. |

WILLIAM F. O'DEA, *Primary Examiner.*

D. H. LAMBERT, *Assistant Examiner.*

U.S. Cl. X.R.

18—30; 251—82